United States Patent
Ohmura

[15] 3,690,027
[45] Sept. 12, 1972

[54] INTEGRAL GUIDE DEVICE FOR FISHING LINES

[72] Inventor: Ryuichi Ohmura, 19-3, Minami-cho, Shizuoka, Japan

[22] Filed: Dec. 10, 1970

[21] Appl. No.: 96,952

[52] U.S. Cl. ..................................... 43/24, 113/116
[51] Int. Cl. .............................................. A01k 87/04
[58] Field of Search ............................................. 43/24

[56] References Cited

UNITED STATES PATENTS

| | | | |
|---|---|---|---|
| 2,293,280 | 8/1942 | Covington | 43/24 |
| 2,760,292 | 8/1956 | Runge | 43/24 |
| 2,992,506 | 7/1961 | Garbolino | 43/24 |

FOREIGN PATENTS OR APPLICATIONS

| | | | |
|---|---|---|---|
| 958,420 | 9/1949 | France | 43/24 |
| 58,249 | 5/1953 | France | 43/24 |
| 1,184,340 | 2/1959 | France | 43/24 |

*Primary Examiner*—Samuel Koren
*Assistant Examiner*—Daniel J. Leach
*Attorney*—Holman & Stern

[57] ABSTRACT

An integral guide device for fishing lines comprising a flat ring, a pair of first legs extending downwardly from the opposite peripheral sides of the ring at a gentle slope on one side of the plane of the ring and converging toward their lower ends, a first foot provided by the converging lower ends of the first legs and extending at substantially right angles with respect to the plane of the ring, a second leg extending downwardly from the lower periphery of the ring at a substantially midpoint between the first legs and sloping on the opposite side of the plane of the ring and a second foot provided by the lower end of the second leg and extending at substantially right angles with respect to the plane of the ring.

3 Claims, 9 Drawing Figures

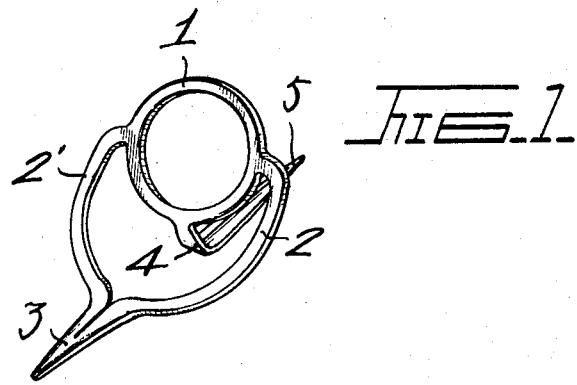
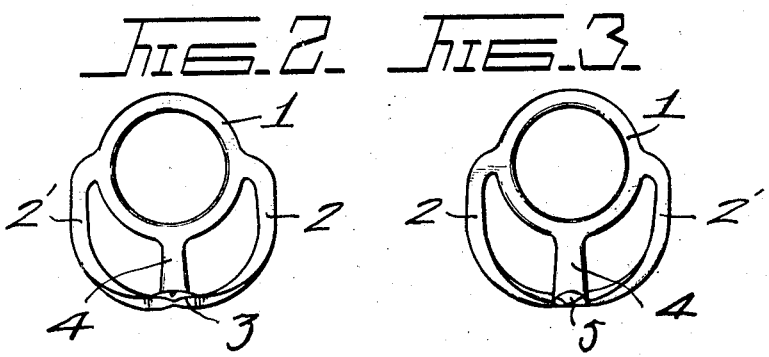
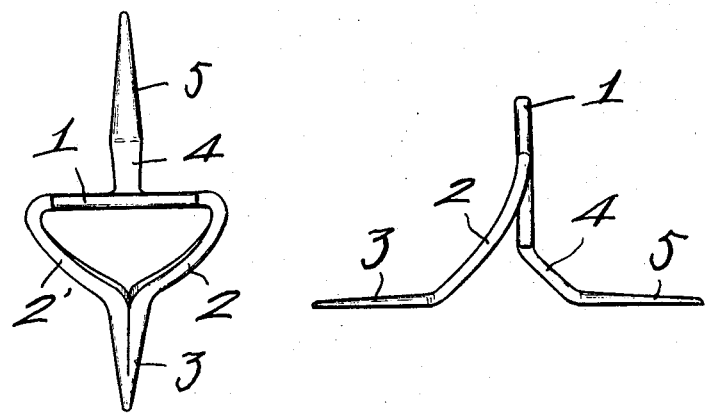

INTEGRAL GUIDE DEVICE FOR FISHING LINES

BACKGROUND OF THE INVENTION

There have been proposed a great variety of guide devices for fishing lines and most of such devices have been formed of metal stocks. Each of such prior art guide devices for fishing lines generally comprises, as its essential components, an annular ring through which a fishing line is guided, a pair of legs adapted to support the ring in spaced relation to a fishing rod on which the guide device is to be mounted and a pair of feet adapted to be secured to the fishing rod by means of strings and the like securing means.

The prior art metal guide devices for fishing lines referred to above substantially vary by function and production cost depending upon the types of construction and/or process in which the guide devices are fabricated. The prior art metallic guide devices for fishing lines may be generally classified into the following three types.

(1) A fishing line guide assembly device comprising a ring, a pair of legs and a pair of feet all of which are formed as separate parts and assembled together by welding, soldering and the like.

(2) A fishing line guide device comprising a ring, a pair of legs and a pair of feet all of which are integrally formed by bending a length of wire stock.

(3) A fishing line guide device comprising a ring, a pair of legs and a pair of feet all of which are integrally formed by processing a piece of sheet metal.

As one form of the (3) type guide device, there has been proposed a guide device comprising a ring, a first leg extending downwardly from one peripheral side of the ring at a substantially midpoint in the height of the ring at a gently sloped angle with respect to the plane of the ring on one major side of the latter, a first foot contiguous to the lower end of the leg and extending outwardly of the leg at substantially right angles with respect to the plane of the ring, a second leg extending downwardly from the opposite peripheral side of the ring in the same height and at the same gentle angle as the first leg on the other or opposite major side of the ring and a second foot contiguous to the lower end of the second leg and extending outwardly of the associated leg. As another form of the (3) type guide device, there has been proposed a guide device comprising a ring, a pair of connecting portions extending horizontally and outwardly from the diametrically opposite peripheral sides of the ring at a substantially midpoint in the height of the ring, a first pair of legs connected at the upper ends to the outer ends of the respective connecting portions and converging toward their lower ends to describe a substantially U-shaped opening therebetween at a gently sloped angle with respect to the plane of the ring on one major side of the latter, a first foot contiguous to the converging lower ends of the legs and extending outwardly of the associated legs at substantially right angles with respect to the plane of the ring, a second pair of legs connected to the upper ends to the outer ends of the above-mentioned connecting portions and converging toward their lower ends to describe a substantially U-shaped opening therebetween at the same gentle angle as the first pair of legs with respect to the plane of the ring on the other or opposite major side of the latter and a second foot contiguous to the lower ends of the second pair of legs and extending outwardly of the associated legs at substantially right angles with respect to the plane of the ring.

The guide device (1) is disadvantageous in that since the parts of this type of device are subjected to the heat from the welding, soldering or the like operation as these parts are assembled together to form a complete guide device, the material of the parts is undesirably annealed and/or weakened to such degree that the thus produced guide device may be easily subjected to deformation when the device is applied a high stress thereon as a fishing line is passed through the guide device under a substantially high tension.

The guide device (2) is objectionable in that since the ring usually generally has an irregular annular configuration, when a fishing line is passed through the ring the line is frequently abrasively contacted by the ring resulting in damage or breakage in the line.

Lastly, the guide device (3) is not satisfactory in that since the ring, legs and feet of this type of guide device are integrally formed from a single piece of sheet metal and the ring, which preferably has a greater thickness and strength than the rest parts of the device because the ring is most abrasively contacted by a fishing line as the line passes through the device, has the same thickness and strength as those of the rest parts which the material of these parts itself inherently has as they are formed from a single piece of sheet metal and as a result, the ring inevitably presents a sharp edge or edges against which a fishing line contacts abrasively thus resulting in damage or breakage in the fishing line as experienced with the (2) type of guide device. In addition, since the parts of the (3) type of guide device are formed by bending a single piece of sheet metal, the junctures between the parts are inevitably reduced in thickness and a fishing line is frequently caught in the junctures.

In the one form of guide device of the (3) type referred to above, there is a great possibility of fishing lines being caught by the parts of the device as the lines are being passed therethrough and the structural strength of such a device is relatively low. The other form of the (3) type guide device is generally satisfactory, but since the connecting portions project from the diametrically opposite peripheral sides of the ring at substantially right angles with respect to the ring periphery, also in this type of guide device there is a great possivility of fishing lines being caught by the connecting portions. And the combined mass of the legs and feet is substantially larger than that of the ring in the device and accordingly, material expenses for the device are unsatisfactorily high.

In order to eliminate the disadvantages inherent in the prior art fishing line guide devices referred to above, an improved fishing line guide device has been proposed and the improved guide device comprises a pair of identical guide members integrally connected together by a connecting means defined by an eyelet, each of said guide members having an integral construction including a ring portion, a leg portion having two arms connected at the upper ends to the outer periphery of said ring portion and converging at the lower ends, and a foot portion having one end connected to said converged lower ends of said arms, said leg portion sloping outwardly and extending downwardly from said ring portion at an angle with respect to the plane of the ring portion and said foot portion extending outwardly and horizontally from said converged lower ends of the leg portion arms at right angles with respect to said plane of the ring portion.

SUMMARY OF THE INVENTION

This invention relates to an integral guide device for fishing lines and a method for producing the integral guide device and more particularly, to an integral guide device which is an improvement over and simpler than the last-mentioned guide device for fishing lines and a method for producing the improved and simpler guide device.

One object of the present invention is to provide an integral guide device for fishing lines all the component parts of which have been integrally formed by stamping and bending a piece of sheet metal.

Another object of the present invention is to provide an integral guide device for fishing lines comprising integral component parts in quite a small number.

Another object of the present invention is to provide a method for producing an integral guide device for fishing lines in quite an economical manner requiring a very few number of processing steps.

In one aspect, the present invention provides an integral guide device for fishing lines comprising a flat ring; a pair of first legs extending downwardly from the opposite peripheral sides of said ring at a gentle slope with respect to the plane of said ring on one major side of the latter and converging toward their lower ends; a first foot contiguous to said lower ends of the first legs and lying at substantially right angles with respect to said plane of the ring; a second leg extending downwardly from the lower periphery of said ring at a substantially midpoint between said first legs at a gentle slope with respect to said plane of the ring on the opposite major side of the latter; and a second foot contiguous to the lower end of said second leg and lying at substantially right angles with respect to said plane of the ring.

In another aspect, the present invention provides a method for producing an integral guide device for fishing lines comprising the steps of stamping a flat unitary stock of said guide device out of a piece of sheet metal, said stock having a ring, a pair of leg forming portions extending downwardly from the opposite peripheral sides of said ring and converging toward their lower ends describing a substantially V-shaped opening therebetween, a first foot forming portion contiguous to said lower ends of the first leg forming portions and defining the lower portion of the V-shaped opening therein and a second leg and foot forming portion extending downwardly from the lower periphery of said ring at a substantially midpoint between said first leg forming portions with the lower end thereof extending into said lower portion of the V-shaped opening defined in said first foot forming portion and separated from the latter; bending said pair of first leg forming portions and first foot forming portion together in a first direction away from said plane of the ring so as to form a pair of first legs which lie at a gently sloped angle with respect to the plane of the ring and a common first leg which lies at substantially right angles with respect to the ring plane, respectively; and bending said second leg and foot forming portion in a second direction away from said plane of the ring opposite to said first direction so as to form a second leg which lies at a gently sloped angle with respect to said plane of the ring and a second foot which lies at substantially right angles with respect to said plane of the ring, respectively.

The above and other objects and attendant advantages of the present invention will be more readily apparent to those skilled in the art from a reading of the following detailed description in conjunction with the accompanying drawing which shows one preferred form of fishing line guide device of the preset invention for illustration purpose only, but not for limiting the scope of the invention.

BRIEF DESCRIPTION OF THE DRAWING

FIG. 1 is a perspective view of one preferred form of integral fishing line guide device of the invention showing the device on an enlarged scale;

FIG. 2 is an elevational view of said guide device of FIG. 1 as seen on one major side thereof;

FIG. 3 is an elevational view of said guide device of FIG. 1 as seen on the opposite major side thereof;

FIG. 4 is a top plane view of said guide device of FIG. 1;

FIG. 5 is a side elevational view of said guide device of FIG. 1;

FIG. 6 is a side elevational view of a fishing rod with portion thereof broken away and which shows the manner in which a plurality of integral fishing line guide devices of the invention are attached to the fishing rod.

PREFERRED EMBODIMENT OF THE INVENTION

Figure 7A:
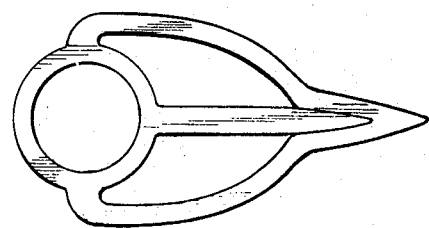
FIGS. 7A–7C are views showing the different stages in carrying out the method according to the present invention.
Figure 7B:
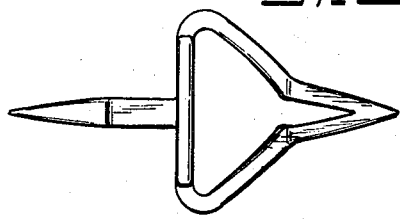
Figure 7C:
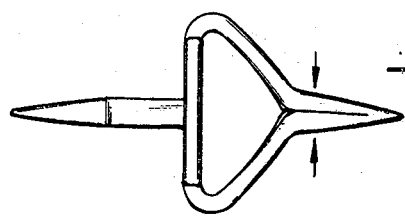

The present invention will be now described referring to the accompanying drawing in which one preferred form of fishing line guide device of the invention is illustrated. The illustrated fishing line guide device has an integral construction including a ring through which a fishing line is to be guided, a pair of first legs provided on one major side of the ring and having a common securing foot and a second leg provided on the opposite side of the ring and having a securing foot, all of which have been formed by stamping a piece of sheet metal having a desired thickness and strength using conventional stamping devices and thereafter, by bending the stamped stock into a desired shape using conventional bending devices.

In forming the fishing line guide device of the invention, a piece of sheet metal having a desired thickness and strength is first stamped to form a flat integral construction stock of the guide device having a ring 1 through which a fishing line is to be guided; a pair of first support leg forming portions which extend downwardly from the opposite peripheral sides of the ring 1 at a substantially midpoint in the height of the ring and converge toward their lower ends defining a substantially V-shaped opening therebetween thereby to provide a common foot forming portion defining the lower portion of the V-shaped opening between the first leg forming portions therein; and a second leg and foot forming portion which extends downwardly from the lower periphery of the ring 1 at a substantially midpoint between the first leg forming portions.

After the guide device stock having the above-mentioned integral component parts has been formed, the pair of first leg forming and foot forming portions are bent together in a first direction away from the plane of the ring 1 using suitable forming devices in such a manner that a pair of first legs 2 and 2' which lie at a gently sloped angle with respect to the plane of the ring 1 and a common first leg 3 which lies at substantially right angles with respect to the ring plane are formed. Thereafter, the second leg and foot forming portion is bent in a second direction away from the plane of the ring 1 opposite to the first direction using suitable forming devices in such a manner that a second leg 4 which lies at a gently sloped angle with respect to the plane of the ring 1 and a second foot 5 which lies at substantially right angles with respect to the plane of the ring 1 are formed on the side of the ring 1 opposite to the side where the first legs 2, 2' and first foot 3 lie. The second foot 5 lies in substantially the same plane as the first foot. Finally, the lower portion of the V-shaped opening defined in the first foot 3 is eliminated by laterally pressing the first foot 3 thereby to complete a desired fishing line guide device.

In the illustrated embodiment of the invention, although the lower end of the second leg and foot forming portion when the stock of the guide device has been stamped is shown as extending into the lower portion of the V-shaped opening defined in the first foot forming portion, alternatively, the V-shaped opening may not extend into the first foot forming portion and the lower end of the second leg and foot forming portion may terminate short of the first foot forming portion thereby to eliminate the step of lateral pressing of the first foot forming portion. Such alternative is still within the scope of the present invention.

From the foregoing, it will be noted that according to the present invention an integral fishing line guide device can be manufactured in quite a simple manner without the necessity for welding, soldering or the like of the component parts which inevitably applies heat on the parts thereby to eliminate the difficulties as experienced with the conventional fishing line guide devices such as annealing and/or weakening of the parts. In addition, since the guide device has the integral component parts as mentioned above, the device has a rigid construction and there will be no possibility of separation and/or deformation of the parts. And since the guide device can be manufactured requiring only a few process steps and has a relatively small number of parts, the device can be economically manufactured on a mass production scale. Lastly, the guide device can be easily handled because the device is light in weight and has an aesthetic appearance.

In use, a plurality of the guide devices are fixedly mounted on a fishing rod in a suitably spaced relationship along the length of the fishing rod by securing the first and second foots 3 and 5 to the fishing rod using conventional securing means such as strings and the like in the conventional manner.

Although one preferred embodiment of the present invention has been described and shown herein, it is to be understood that the same is illustrative in nature and not to necessarily limiting upon the scope of the teaching in its broader aspect. Many additional variations within the scope of the appended claims will occur to those skilled in the art.

What is claimed is:

1. An integral guide device for fishing lines comprising a flat ring; a pair of first legs extending downwardly from the opposite peripheral sides of said ring at a gentle slope with respect to the plane of said ring on one major side of the latter and converging toward their lower ends; a first foot contiguous to said lower ends of the first legs and lying at substantially right angles with respect to said plane of the ring; a second leg extending downwardly from the lower periphery of said ring at a substantially midpoint between said first legs at a gentle slope with respect to said plane of the ring on the opposite major side of the latter; and a second foot contiguous to the lower end of said second leg and lying at substantially right angles with respect to said plane of the ring.

2. An integral guide device for fishing lines as set forth in claim 1, in which said first and second feet lie in substantially the same plane on the opposite major sides of said ring.

3. An integral guide device for fishing lines as set forth in claim 1, in which said pair of first legs define a substantially V-shaped opening therebetween and merge at said converging lower ends so as to provide said first foot.

* * * * *